United States Patent
Abdel-Malik et al.

(10) Patent No.: US 6,599,542 B1
(45) Date of Patent: *Jul. 29, 2003

(54) NON-STICK CHEWING GUM BASE

(75) Inventors: Magdy Malak Abdel-Malik, Chester, NJ (US); Arun Vishwanathan, Wilmington, DE (US); Angel Manuel Orama, Hopatcong, NJ (US)

(73) Assignee: Warner-Lambert Company, Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/131,771

(22) Filed: Aug. 11, 1998

(51) Int. Cl.⁷ .................................................. A23G 3/30
(52) U.S. Cl. ............................................. 426/4; 426/6
(58) Field of Search ..................... 426/3, 4, 6

(56) References Cited

U.S. PATENT DOCUMENTS

| | | | |
|---|---|---|---|
| 4,241,090 A | 12/1980 | Stroz et al. | 426/4 |
| 4,387,108 A | 6/1983 | Koch et al. | 426/4 |
| 4,518,615 A | 5/1985 | Cherukuri et al. | 426/4 |
| 5,424,081 A | 6/1995 | Owusu-Ansah et al. | 426/4 |
| 5,431,930 A | 7/1995 | Patel et al. | 426/3 |
| 5,437,875 A | 8/1995 | Synosky et al. | 426/3 |
| 5,437,876 A | 8/1995 | Synosky et al. | 426/3 |
| 5,437,877 A | 8/1995 | Synosky et al. | 426/3 |
| 5,462,754 A | 10/1995 | Synosky et al. | 426/4 |
| 5,482,722 A | 1/1996 | Cook | 426/3 |
| 5,601,858 A | 2/1997 | Mansukhani et al. | 426/3 |
| 5,882,702 A * | 3/1999 | Abdel-Malik et al. | 426/3 |

FOREIGN PATENT DOCUMENTS

| | | |
|---|---|---|
| FR | 2770375 | 6/1999 |
| WO | 9317570 | 9/1993 |
| WO | 9317572 | 9/1993 |
| WO | WO 9317573 | 9/1993 |
| WO | 9317575 | 9/1993 |
| WO | 9532634 | 12/1995 |
| WO | 9532637 | 12/1995 |
| WO | WO 9815189 | 4/1998 |

* cited by examiner

*Primary Examiner*—Arthur L. Corbin
(74) *Attorney, Agent, or Firm*—Waton & Kipnes, P.C.

(57) ABSTRACT

A non-stick chewing gum base containing from about 2 to 25% of a plasticized proteinaceous material and a combination of gum base materials, absent elastomer solvent and wax, which render a chewing gun composition non-stick with respect to non-porous surfaces, such as denture materials, as well as common surfaces such as floors, and including porous surfaces such as carpets.

9 Claims, No Drawings

US 6,599,542 B1

NON-STICK CHEWING GUM BASE

RELATED APPLICATION

This application is related to U.S. Ser. No. 08/936,570 filed Sep. 24, 1997, now U.S. Pat. No. 5,882,702.

BACKGROUND OF THE INVENTION

1. Field of the Invention

The invention relates to the use of plasticized proteinaceous materials and composition containing the same especially for the preparation of chewing gums which have unique non-stick properties. The chewing gums, in addition to non-stick properties on a wide variety of substrates including porous and non-porous substrates, possess high flavor properties similar to conventional chewing gums.

The plasticized proteinaceous material is made by first combining at least one protein and at least one plasticizer into a solid state combination which is then treated under heat and controlled shear conditions to produce a plasticized proteinaceous material having properties, which when blended with other ingredients employed in the chewing gum composition, provide the chewing gum with non-stick properties.

2. Description of the Prior Art

Chewing gums are traditionally comprised of a water insoluble base portion and a water soluble portion which contains flavors and sweeteners. The base portion includes a gum base part which includes a masticatory substance which imparts the chew characteristics to the final product. The gum base typically defines the release profile of flavors, and sweeteners and plays a significant role in the gum product. The flavors and sweeteners provide the sensory appeal aspects of the chewing gum.

Chewing gum bases conventionally contain materials called elastomers which provide the bounce or rubber character to the gum. Elastomers are water-insoluble polymers, both natural, such as natural rubbers and chicle, and synthetic polymers, such as styrene butadiene copolymers, polyisobutylene, polyethylene and the like. The elastomers are usually combined with polyvinyl acetates (PVAc) of varying molecular weight to provide stretch or elasticity to the gum base. Conventional gums will also contain materials such as resins which are used as elastomer solvents to soften the elastomer; waxes; fats and/or oils which can act as plasticizers; fillers and optionally, antioxidants and emulsifiers.

Conventional ingredients and techniques for the manufacture of chewing gums are known such as described in Sugar Confectionery Manufacture, $2^{nd}$ Edition, E. B. Jackson, editor, Blackie Academic & Professional, Glasgow, NZ (1995), at pages 259–286, incorporated herein by reference.

Efforts have been made to provide chewing gum compositions with non-stick properties, typically by.eliminating waxes. For example, U.S. Pat. No. 5,482,722 and U.S. Pat. No. 5,462,754 disclose a gum composition containing a wax free gum base, natural and synthetic elastomers, fats and oils and/or softeners.

U.S. Pat. No. 5,424,081 discloses a non-adhesive chewing gum base including a gluten component and a protein condensing agent. U.S. Pat. No. 4,241,090 is directed to a non-adhesive chewing gum composition containing alpha cellulose and one or more thickening agents including hydrolyzed cereal solids, us malto-dextrin, modified food starch and the like.

International Publication No's. WO 95/32,634 and WO 95/32,637 disclose non-stick gum compositions containing medium chain triglycerides. U.S. Pat. No. 5,431,930 concerns a non-stick gum composition with medium chain triglycerides and lecithin. Other non-stick gum compositions are disclosed in U.S. Pat. No's. 5,437,875; 5,437,876; 5,437,877; as well as, International Publication No's. WO 93/17570; WO 93/17572; and WO 93/17575.

Prior art non-stick gum compositions of the type mentioned above are disadvantageous because they are non-stick only on smooth non-porous surfaces such as denture material and/or have inadequate sweetness and/or flavor release properties.

An effort to provide a gum composition that is non stick on both porous and non-porous surfaces is disclosed in U.S. Pat. No. 5,601,858 which discloses a non-stick chewing gum base composition which is free from fats, waxes, and elastomer solvent resins. The gum base includes (a) a blend of polyvinylacetates having different molecular weights, (b) a non-elastomer solvent resin plasticizer including glycerol triacetate, acetylated monoglyceride and mixtures thereof and (c) a filler such as calcium carbonate, alumina, talc, clay and the like. The gum composition is non-stick with respect to a variety of surfaces including, denture material, wood, asphalt, concrete, carpet, hair and cloth.

Native proteins, due to their general lack of flexibility, do not exhibit or mimic properties of gum base such as elasticity, extensibility and chewability. Denatured proteins have been used in chewing gums but the art has not provided protein-based gums on a sensory level with conventional gums nor with non-stick properties. For example, U.S. Pat. No. 5,482,722 discloses a proteinaceous chewable base for use with confectionery products in which prolamine is dissolved in an alcohol/water solvent system and a texturizing agent is added to form a precipitate with the texturizing agent entrapped therein.

While such systems can be used to form proteinaceous materials that can be substituted for elastomers conventionally used in gums and confectionery compositions, such materials still do not effectively convey the same sensory properties that are associated with conventional chewing gums nor do they provide for non-stick properties.

It would therefore be a significant advance in the art of developing chewing gums to provide the same with non-stick properties that are effective on a wide variety of surfaces, including porous and non-porous surfaces such as leather, rubber and the like and which have the same or similar sensory characteristics as conventional gums.

SUMMARY OF THE INVENTION

The present invention is in part directed to non-stick chewing compositions containing plasticized proteinaceous materials which are derived from the combination or blend of at least one protein (i.e. a protein component) and at least one plasticizer (i.e. a plasticizer component). The blend is preferably heated under controlled shear conditions to produce a plasticized proteinaceous material which in combination with certain conventional ingredients of chewing gums imparts desired non-stick properties to the product while providing the product with desirable taste and sensory characteristics.

More specifically, the present invention is directed to a non-stick chewing gum composition comprising:

a) from about 2 to 25% by weight of a plasticized proteinaceous material comprising a protein component and plasticizer component wherein a solid state blend of the protein component and the plasticizer component have been heated under controlled shear conditions at a temperature of from about 20° C. to about 140°C.;

b) in combination with chewing gum base ingredients in an amount sufficient to impart chewing gum characteristics to the chewing gum composition in the absence of an elastomer solvent and a wax.

In a particular aspect of the present invention, the non-stick chewing gum composition contains, in addition to the plasticized proteinaceous material, an elastomeric material and/or polyvinyl acetate as well as a softener/emulsifier which serves as plasticizer for the elastomeric material and/or the polyvinyl acetate.

DETAILED DESCRIPTION OF THE INVENTION

In general, the present invention is directed to non-stick chewing gum compositions containing plasticized proteinaceous materials wherein a plasticizer or mixture thereof (plasticizer component) is dispersed.within a matrix of at least one protein (protein component).

As used herein, the term "gum base" shall include those materials which form the gum composition absent those materials including sugar, flavors and colorants which impart a desirable taste and color to the gum composition. The term "gum composition" shall include the gum base materials in addition to sugar, flavors and colorants.

The successful formation of a plasticized proteinaceous material for use in accordance with the present invention depends first upon the proper selection of one or more blends comprising a protein or mixture thereof and a plasticizer or mixture thereof. Preferred combinations of the protein and plasticizer can be ascertained by variables including the solubility parameter, the free volume of the blend, and the glass transition temperature of the blend as described in detail in U.S. patent application Ser. No. 08/936,570 filed Sep. 24, 1997, the entire contents of which is incorporated herein by reference.

The resulting blend of the protein component and the plasticizer component is then processed, preferably under heating and under controlled shear conditions, to provide a plasticized proteinaceous material which can replace one or more of the conventional ingredients in chewing gums (e.g. waxes) and when combined with certain combinations of other conventional ingredients imparts non-stick properties to the chewing gum composition while achieving desirable taste and sensory properties.

The preferred process for making the plasticized proteinaceous material denatures the protein component in a melt state, i.e., a protein component in the form of a viscous liquid. More specifically the process comprises heating under controlled shear conditions the blend of the protein component and the plasticizer component preferably in the solid state prior to processing, such that upon cooling, the plasticizer component becomes entrapped within a denatured matrix of the protein component.

Melting, or fusing, is a term generally used to describe the transformation of materials from the solid to liquid phase by the application of heat. Material that melts has flow and processability. As is found with many of the synthetic polymers, proteins generally do not melt or flow upon heating. They usually decompose before the temperatures necessary to melt a protein can be reached. Plasticizers are substances which are usually added to polymeric materials to provide a blended material which will flow upon heating and thereby increase the workability or flexibility of the polymer. The heating of a blend of the plasticizer component with a protein component in the solid state to the melt state occurs without concomitant decomposition of the protein component and with concomitant denaturation of the protein component. It will be understood that a single protein or mixture of proteins may be combined with a single plasticizer or mixture of plasticizers to form a blend.

The selection of a suitable protein or mixture thereof will depend in part on the molecular weight of the protein and its processability within the range of temperatures desired for the formation of the non-stick gum. Typical processing temperatures for forming chewing gums are within the range of from about 40° to 120° C. A suitable protein is also amenable to processing using conventional mixing equipment including extruders, blenders and the like.

The molecular weight of the protein must be sufficiently high so that the protein is classified as a polymer. Molecular weights of at least about 5,000, preferably at least about 10,000 are suitable.

The protein selected for the formation of the plasticized proteinaceous material must be matched with a suitable plasticizer. This process which considers the solubility parameter, free volume and glass transition temperature is described in detail in U.S. patent application Ser. No. 08/936,570 filed Sep. 24, 1997.

The matching of a suitable protein component with a plasticizer component depends first on considering the solubility parameters of the protein component and the plasticizer component which are determined by their relative cohesive properties. The solubility parameter of various materials and methods of calculating the same is known in the art as disclosed, for example, in D. W. Van Krevelen Elsevier "Properties of Polymers" (1990), incorporated herein by reference as well as U.S. patent application Ser. No. 08/936,570.

The normal effect of increasing the free volume of a polymer is that it is plasticized (i.e. the glass transition temperature is lower, the modulus and tensile strength decreases, and the elongation and impact strength increases). However, the freedom of movement afforded by the plasticizer also permits the polymer molecules, if it is their nature to do so, to associate tightly with each other.

In general, free volume is based on the principle that a suitable plasticizer increases the free volume of the protein. An increase in the free volume of the protein increases the mobility of the protein and therefore the extent of plasticization. Thus, if more plasticization is desired, the amount of the plasticizer can be increased as described in U.S. patent application Ser. No. 08/936,570.

Once a potential blend of a protein component and a plasticizer component has been identified by comparing the respective solubility parameter values of the protein component and the plasticizer component alone or optionally the free volume of the blend as discussed above, the glass transition temperature of the end product (plasticized proteinaceous material) must be considered. For example, for chewing gums a suitable glass transition temperature for the plasticized proteinaceous material is in the range of, for example, from about 35° to 45° C.

The glass transition temperature of the plasticized proteinaceous material therefore is determined by the ratio of the respective coefficients of thermal expansion, the volume fraction of the plasticizer component and the difference between the respective glass transition temperatures of the plasticizer component and the protein component.

Generally, the glass transition temperature of the plasticized proteinaceous material can be increased by selecting a plasticizer component having a relatively high coefficient of thermal expansion and/or a higher glass transition temperature. If a lower glass transition temperature of the plasticized proteinaceous material is desired, it is appropriate to select a protein having a relatively high coefficient of thermal expansion and/or a lower glass transition temperature.

The proteins suitable for use in, the present invention may be any synthetic or natural protein such as any plant or animal protein which is water insoluble. The protein may be enzymatically modified, chemically modified or the product of genetic engineering technology. The protein may be substantially pure or may be a part of a mixture such as in a grain fraction. It will be understood that when grain fractions are employed, the glass transition temperature of one batch may differ from another and this may affect the solubility parameter values and/or the glass transition temperature thereof.

The protein may be selected from but not limited to:
  grain proteins such as corn, wheat, barley, rice, oat, soya and sorghum proteins and their fractions including gluten and prolamines such as zein, glutenin and gliadin; and
  animal proteins such as collagen, egg and milk proteins including gelatin, egg albumin (ovalbumin), lactalbumin, casein and sodium caseinate, whey, and milk isolates such as blends of caseinate and whey.

Preferred protein components contain at least one protein material selected from wheat, corn, rice, soybean milk and animal proteins.

In addition to insolubility in water other factors may be preferred for the protein including viscoelastic properties. For example, a product having a more viscoelastic character is generally provided by use of a protein component selected from the wheat and corn protein groupings including corn zein and wheat gliadin, or gelatin, and their blends. By contrast a product having less viscoelastic character is generally provided by use of a protein component selected from egg white, whey and sodium caseinate.

The plasticizer, as discussed previously herein, is a material which provides both workability to the plasticized proteinaceous material and contributes to its viscoelastic character. The plasticizer or mixture thereof suitable for use in the present invention may be selected from a variety of materials including organic plasticizers and those like water which do not contain organic compounds.

Organic plasticizers which are the preferred class of plasticizers include, but are not limited to, phthalate derivatives such as dimethyl, diethyl and dibutyl phthalate; polyethylene glycols with molecular weights preferably from about 200 to 6,000; glycerol; glycols such as polypropylene, propylene, polyethylene and ethylene glycol; citric esters such as tributyl, triethyl and triacetyl citrates; surfactants such as sodium dodecyl sulfate, polyoxymethylene (20) sorbitan and polyoxyethylene (20) sorbitan monooleate, blended with water; alcohols such as ethanol and isopropyl alcohol; organic acids such as acetic and lactic acids and their lower alkyl esters; bulk sweeteners such as sorbitol, mannitol, xylitol and lycasin; fats/oils such as vegetable oil, seed oil and castor oil; acetylated monoglyceride; triacetin; sucrose esters; traditional flavor oils; or mixtures thereof. Preferred organic plasticizers are the polyols such as glycerol and the glycols, especially propylene glycol, polypropylene glycol, ethylene glycol and polyethylene glycol, and organic acids especially lactic and acetic acids, and their corresponding esters.

The amount of the protein component present in the protein/plasticizer blend will vary as discussed above. Consideration must be given to the desired glass transition temperature of the plasticized proteinaceous material. Typically the amount of protein component will be at least 40% by weight and most typically at least 50% by weight. Especially good plasticized proteinaceous materials are generally obtained when the amount of the protein component is from about 60 to 75% by weight.

Preferred amounts of typical plasticizers based on the total weight of the as protein/plasticizer blend include, for example, aqueous ethanol (20–40% by weight), propylene glycol (20–40% by weight) ethylene glycol (10–30% by weight), and acetic acid and lactic acid (10–30% by weight). It will be understood that for applications involving food products (e.g. chewing gum and confectionery compositions) ethanol may not be preferred because of regulatory requirements governing its use.

Preferred blends of proteins and plasticizers for non-stick chewing gums in accordance with the present invention include zein/propylene glycol/glycerol; zein/glycerol/propylene glycol/acetic acid/water; zein/lactic acid/glycerol/propylene glycol/glycol; and zein/lactic acid/propylene glycol/ethyl lactate/butyl lactate/ethyl acetate/glycerol.

The protein component and the plasticizer component are each used in the dry state, i.e., a pre-blend of protein and plasticizer would have the physical properties of a powder with the plasticizer dispersed uniformly with the protein. The protein/plasticizer blend will usually be comprised of a blend of proteins, and/or a blend or plasticizers to take advantage of the property of each component so as to maximize the compatibility of the components of the blend.

The protein and plasticizer are combined into a blend and the blend is treated to form a mixture with the plasticizer dispersed within a matrix of the protein. In a preferred form of the invention, the mixture of the protein and the plasticizer comprises a highly viscous material at the melt stage of the protein (i.e. a plasticized proteinaceous material). Both the melt temperature and the viscosity of the blend at the melt temperature can be affected by the type and the amount of plasticizer present. In general, the greater the amount of plasticizer used in the practice of the present invention to form the plasticized proteinaceous material, the lower the melt temperature and the lower the viscosity of the blend used to form the plasticized proteinaceous material.

Other materials are blended with the protein component either prior to or after the melt-plasticization. Varying amounts of the protein component and the plasticizer component can be used to provide materials which impart non-stick properties to the chewing gum composition in part because materials such as conventional elastomer solvents (e.g. rosins) and waxes (e.g. paraffin, microcrystalline or natural waxes) are omitted from the chewing gum composition of the present invention. In the production of non-stick chewing gum compositions of the present invention, combinations of gum base materials in desirable amounts provide the non-stick chewing gum composition with excellent taste and sensory properties.

More specifically, the non-stick chewing gum composition of the present invention comprises the combination of a plasticized proteinaceous material as previously defined in combination with a unique combination of gum base materials in effective amounts which provide non-stick properties on a variety of porous and non-porous substrates and desirable taste and sensory characteristics.

The plasticized proteinaceous material is present in the gum base of the chewing gum composition in an amount typically from about 2 to 25% by weight, preferably from about 5 to 15% by weight.

The preferred non-stick gum composition also includes gum base materials including an elastomeric material (i.e. elastomers) and/or polyvinyl acetate, as well as softeners (emulsifier).

The elastomers can include natural and/or synthetic elastomers. Examples of natural elastomers include jelutong, lechi, caspi, perillo, sorva, massaranduba balata, massaranduba chocolate, nispero, rosindinha, chicle, gutta hang kang, smoked or liquid latex, and guayule and combinations thereof.

Examples of synthetic elastomers include polyisobutylene, isobutylene-isoprene copolymer, styrene-butadiene copolymer, vinyl acetate-vinyl laurate copolymer, polyisoprene, polyethylene, and combinations thereof.

The amounts of the elastomer which can be employed in the gum base of non-stick chewing gum composition of the present invention is generally from about 2 to 25% by weight, preferably from about 5 to 15% by weight, based on the total weight of the gum base.

Polyvinyl acetates (PVAc) may be present with or without the presence of an elastomer. PVAc are included in the non-stick chewing gum composition in amounts dependent upon their molecular weight range. It has been determined that a desirable weight average molecular weight range for the polyvinyl acetates is at least about 8,000, preferably from about 8,000 to 100,000. The total amount of PVAc in the gum base of the non-stick chewing gum composition is typically from about 25% to 75% by weight, preferably from about 40 to 55% by weight based on the total weight of the gum base of the non-stick chewing gum composition.

Typical softeners (i.e. the term "softeners" is used in its customary broad sense and includes emulsifiers) for use in the non-stick chewing gum composition include tallow, hydrogenated tallow, hydrogenated and partially hydrogenated vegetable oils, cocoa butter, glyceryl monostearate, glyceryl monolaurate, glyceryl monooleate, polysorbate 60, polysorbate 65, tween 65, tween 80, glycerol triacetate, lecithin, mono-, di-, and tri-glycerides, acetylated monoglycerides fatty acids and combination thereof. Preferred fatty acids include stearic, palmitic, oleic and linoleic acids. The softener may be generally employed in an amount from about 3 to 35% by weight, preferably from about 10 to 20% by weight based on the total weight of the gum base of the non-stick chewing gum composition.

The gum base may also include effective amounts of fillers. Fillers are used to increase the hardness of the chewing composition while still maintaining appropriate cold flow properties. Useful fillers include organic and inorganic compounds such as calcium carbonate magnesium carbonate, ground limestone, silicates including magnesium silicate, aluminum silicate, clay, alumina, talc, titanium oxide, calcium phosphate, tricalcium phosphate, dicalcium phosphate, cellulose polymers such as wood and the like, and mixtures thereof. Typically, the filler is employed in the gum base of the non-stick chewing gum composition in an amount from about 5% to about 25% by weight preferably from about 5 to 15% by weight, based on the total weight of the gum base of the non-stick chewing gum composition. It will be understood that the amount of filler will depend in part on the particular filler selected, and the amount of filler needed to obtain a desired hardness and cold flow of the chewing gum composition.

One or more cellulosic materials may be incorporated into the non-stick chewing gum base as an optional ingredient in amounts generally from about 2 to 10% by weight, preferably from about 2 to 5% by weight, based on the total weight of the gum base of the chewing gum composition. The cellulosic materials useful in the non-stick chewing gum composition of the present invention are water soluble and examples include cellulose, methyl cellulose, ethyl cellulose, methylhydroxyethyl cellulose, methylhydroxypropyl cellulose, hydroxypropyl cellulose and sodium carboxymethyl cellulose and mixtures thereof.

The gum base ingredients previously described are combined with sweeteners, flavoring agents, coloring agents and conventional additives such as thickening agents, acidulants and the like.

In commercial practice it is common to premix a portion of at least some of the gum base materials to form a masterbatch. The masterbatch is then combined with the remaining amounts of the gum base materials plus the other materials (e.g. sweeteners) mentioned above to form a gum composition.

In the present invention a masterbatch can be formed, preferably containing the elastomeric material [e.g. poly (isobutylene-isoprene) copolymer], polyvinyl acetate and the softener.

The non-stick chewing gum composition of the present invention may also contain bulk sweeteners. Suitable sugars include monosaccharides, disaccharides and polysaccharides such as xylose, ribulose, glucose (dextrose), mannose, galactose, fructose (levulose) sucrose (sugar), maltose, invert sugar, partially hydrolyzed starch and corn syrup solids, and mixtures thereof. Suitable non-sugar bulking agents include sugar alcohol bulking agents such as sorbitol, xylitiol, mannitol, galactitol, maltitol, and mixtures thereof, isomalt, maltodextrins; hydrogenated starch hydrolysates; hydrogenated hexoses; hydrogenated disaccharides; and the like, and mixtures thereof. Bulking agents or sweeteners described above, may be used in a wide range of amounts, typically from about 30% to 75% by weight, preferably from about 45 to 60% by weight based on the total weight of the non-stick chewing gum composition.

The non-stick chewing gum compositions may also include high intensity sweeteners. Examples of suitable intense sweeteners include (A) water-soluble naturally-occurring intense sweeteners such as dihydrochalcones, monellin, steviosides, glycyrrhizin, dihydroflavenol, and L-aminodicarboxylic acid aminoalkanoic acid ester amides, such as those disclosed in U.S. Pat. No. 4,619,834, and mixtures thereof; (B) water-soluble artificial sweeteners including the soluble saccharin salts such as sodium or calcium saccharin salts, cyclamate salts, the sodium, ammonium or calcium salts of 3,4-dihydro-6-methyl-1,2,3-oxathiazine-4-one-2, 2-dioxide, the potassium salt of 3,4-dihydro-6-methyl-1,2,3-oxathiazine-4-one-2,2-dioxide (Acesulfam-K), the free acid form of saccharin, and the like, and mixtures thereof; (C) dipeptide based sweeteners including L-aspartic acid derived sweeteners, such as I-aspartyl-L-phenylalanine methyl ester (Aspartame) and materials described in U.S. Pat. No. 3,492,131, L-alphaaspartyl-N-(2, 2,4,4-tetramethyl-3-thietanyl)-D-alaninamide hydrate (Alitame), methyl esters of L-aspartyl-L-phenyl-glycerine and L-aspartyl-L-2,5-dihydrophenyl-glycine, L-aspartyl-2, 5-dihydro-L-phenylalanine, L-aspartyl-L-(1-cyclohexene)-alanine, and the like, and mixtures thereof; (D) water-soluble intense sweeteners derived from naturally-occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose®; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-to dideoxygalactosucrose; 1',6'-dichloro-1',6'-dideoxysucrose; 4-chloro-4-deoxy-alpha-D-galactopyranosyl-1,6-dichloro-1,6-dideoxy-beta-D-fructofuranoside, or 4,1',6'-tnchloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro-4,6,1',6'-tetradeoxygalacto-sucrose; and 4,6,1',6'-tetradeoxy-sucrose, and mixtures thereof; and (E) protein based intense sweeteners such as thaumaoccous danielli (Thaumatin I and II). The intense sweeteners are usually used in an amount of up to about 1% by weight based on the total weight of the chewing gum composition.

The non-stick chewing gum composition may also contain a flavoring agent selected from those flavors known to the skilled artisan, and include natural and artificial flavors. Non-limiting representative flavoring agents include (A) flavor oils such as spearmint, cinnamon, oil of wintergreen (methyl salicylate), peppermint (menthol), clove, bay, anise, eucalyptus, thyme, cedar leaf, oil of nutmeg, allspice, oil of sage, mace, oil of bitter almonds, and cassia oil; (B) artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth; (C) aldehydes and esters such as acetaldehyde, benzaldehyde, anisic aldehyde, cinnamic aldehyde, citral, neral, decanal, ethyl vanillin, heliotrope, piperonal, vanillin, alpha-amyl cinnamaldehyde, butyraldehyde, valeraldehyde, citronellal, decanal, dihydrocarvyl acetate, eugenyl formate, aldehyde C-8, aldehyde C-9, aldehyde C-12, 2-ethyl butyraldehyde, hexenal, tolyl aldehyde, veratraldehyde, 2,6-dimethyl-5-heptenal, 2,6-dimethyloctanal, 2-dodecenal, p-methylanisol, and so forth. Generally any flavoring or food additive such as those described in Chemicals Used in Food Processing, publication 1274, pages 63–258, by the National Academy of Sciences, incorporated herein by reference, may be used. Other ingredients which may be used in the flavor component include acids such as citric, tartaric, malic and the like acidulants. In the non-stick chewing gum compositions of the present invention, the flavoring agent is generally present in amounts from about 0.5% to 4.0% by weight based on the total weight of the chewing gum composition.

The chewing gum composition may also contain a coloring agent selected from but not limited to pigments such as titanium dioxide, which may be incorporated in amounts up to about 0.3% by weight based on the total weight of the non-stick chewing gum composition, natural food colors and dyes suitable for food, drug and cosmetic applications, known as F.D.&C. dyes and lakes. A recitation of all F.D.&C. colorants and their corresponding chemical structures may be found in the Kirk-Othmer Encyclopedia of Chemical Technology, $3^{rd}$ Edition, in Volume 5 at page 857–884, incorporated herein by reference.

Other conventional additives may be used in chewing gum compositions. Example of other conventional additives which may be used include thickening agents such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof.

The non-stick chewing gum composition of the present invention possesses broad reaching non-stick properties. Not only does the chewing gum composition not stick to non-porous materials such as denture material including but not limited to natural teeth, fillings, removable and fixed oral prosthetic devices, dentures and the like, but the gum composition also does not stick to a variety of common surfaces including porous surfaces even at temperatures up to about 40° C.

More specifically, the non-stick chewing gum composition does not stick to common indoor surfaces such as, for example, carpets, rugs, linoleum, tiles, mosaic floors and the like. The gum composition also does not stick to common outdoor surfaces such as concrete based materials, asphalt, marble, stone, brick, deck wood and the like.

Other surfaces to which the gum composition does not stick include, leather soles, rubber soles, woolen fabrics, cotton fabrics and the like.

The term non-stick as used herein shall mean a chewing gum composition in which the composition can be removed from a surface by pulling alone (i.e. without the aid of devices e.g. scrapers, knives and the like, and/or solvents e.g. acetone, toluene and the like and terpene based on commercially available solvent blends).

EXAMPLE 1

Forming Plasticized Proteinaceous Material
I. Batch Mixing

This example illustrates that a selection of proteins and plasticizers or mixtures of plasticizers can be successfully treated to provide a plasticized proteinaceous material for use as a gum base material in the making of a non-stick chewing gum composition of the present invention. This example further illustrates the use of a high shear batch-type mixing apparatus.

The denaturation of the proteins is indicated by a peak in the processing torque values (fusion torque values) due to the phase transition from the powder to a viscous paste. Measurements of the torque values (a measurement of viscosity), glass transition temperatures and the mechanical properties of plasticized proteinaceous materials are made in a conventional manner.

The zein, egg white, milk (whey concentrate, sodium caseinate, milk isolates (blend of 80% caseirate and 20% whey)), and gelatin (GP-8, 250 Bloom) are obtained from Freeman Industries, Clofine Dairy and Food Products, New Zealand Milk Products and Hormel Foods Corporation, respectively. These commercial proteins are used as received.

The propylene glycol and glycerol are from Sigma and the triethyl citrate, polyethylene glycol and sorbitol are from Morflex, Aldrich and SPI Polyols respectively.

In these examples the proteins are plasticized using a C. W. Brabender Torque Rheometer (PL 2,000) with a prep mixer equipped with roller blades. The Brabender Rheometer is a heated chamber which fits over two irregularly shaped rollers. A quantity of material is added to the chamber to 70% capacity by using the following expression: Sample charge=70% x mixer volume x specific gravity of sample. The sample is melted, and the total torque required to turn the rollers in the melt at a given rotational speed, which can be varied continuously, is measured with a dynamometer which includes a movable gear box coupled to a load cell by means of a torque arm. The unit is pre-calibrated but may be recalibrated. The polymer temperature is determined using a thermocouple which protrudes into the sample chamber. The total amount of material used in the mixer is 250 g. The torque values are measured as a function of time at half minute intervals at different temperatures considered significant to the point being illustrated.

Torque is expressed as "meter-gms" or as "newton-meters". These can be easily converted to other units such as poise or pascal-sec. The unit derives from the use of the Brabender Torque Rheometer. Because the torque developed is related to the shear stress applied to the sample, the Rheometer can be used as a Melt Viscometer. The rotational speed of the mixing blades of the Brabender determines the maximum rate of shear to which the sample is subjected. Therefore apparent viscosity=$K_1$ (Torque/RPM) and Shear rate at the Wall=$K_2$ x RPM. $K_1$ and $K_2$ are constants determined by Brabender for different types of bowl and blade. The values for the mixing bowl (Prep Mixer) used in the present invention are $K_1$=10,760 and $K_2$=2.47. Based on these equations, at 30 RPM, the shear rate is approximately 75 $sec^{-1}$ and 1 meter-gms (Torque) is approximately 360 poise or 36 Pa-sec (Apparent Viscosity).

The glass transition temperatures (Tg) of the plasticized proteinaceous materials from the torque Rheometer are determined using a Perkin Elmer Differential Scanning Calorimeter (DSC) 7 instrument at a heating rate of 20° C./min.

II. Extruder Preparation:

This example illustrates the use of protein mixtures with plasticizers to prepare plasticized proteinaceous materials. An extruder is used as the processing apparatus.

Protein-plasticizer blends are melt processed using a counter-rotating conical twin-screw extruder (C. W. Brabender) with metering screw equipped with a rod or a ribbon die. The extruder has three barrel heater/cooling temperature and 1 or 2 die zones. A pressure transducer and a thermocouple are attached at the end of the third zone and the die, respectively, in order to monitor the pressure and the melt temperature during the extrusion process. All of the processing parameters, including the torque and the rpm, are controlled by a computer and are directly printed during the extrusion of the plasticized proteinaceous material. Typical processing conditions are as follows:

| | |
|---|---|
| Processing Temperature (Zones 1 to 4): | 70–100° C. |
| Processing torque: | 500–3000 mg |
| Head pressure: | 80–600 psi |
| RPM: | 20–40 |

The proteins are pre-mixed in different ratios, and are then vigorously mixed with different amounts of plasticizers. The mixtures are then extruded by feeding them through the hopper. The extrudates are collected in the strand form and analyzed.

EXAMPLE 2

Gum Base Preparation

This example illustrates the preparation of a non-stick chewing gum base using plasticized proteinaceous materials of the type prepared in accordance with Example 1. Both the use of a mixing bowl (batch operation) and extruder (continuous operation) are illustrated.

A masterbatch of a portion of the gum base materials was prepared in the following manner. 8.0 parts by weight of an elastomeric material poly (isobutylene-iosprene) copolymer (Butyl 077Mol. Wt.=400,000 obtained from Exxon Chemical Co.), 8 parts by weight of polyvinyl acetate (AYAC, Mol. Wt.=12,800) obtained from Union Carbide Corporation and 8 parts by weight of a softener for the elastomeric material. (DURKEE 17 obtained from Van Den Bergh Foods Company) were combined and mixed until a homogenous mixture was obtained.

The masterbatch was combined with 11 parts by weight of a proteinaceous material obtained from the melt plasticization of zein and glycol 60% and 40% by weight respectively, 39.5 parts by weight of polyvinyl acetate, 6 parts by weight of an emulsifier (NM obtained from Lonza, Inc.) 5 parts by weight of the elastomeric material/softener, 7.5 parts by weight of a filler (ATOMITE obtained from Webber) and 7 parts by weight of a plasticizer (triacetin obtained from Eastman Chemicals) and the mixture was blended in the following manner to form a non-stick chewing gum base.

A 5 kg kettle equipped with Sigma blades was heated through a steam jacket to 110° C. The masterbatch was placed into the kettleand melted. Mixing was commenced as the plasticized zein was added. The masterbatch and zein was mixed under heating until a homogenous mixture was formed at which time the polyvinyl acetate was added.

When the polyvinyl acetate was melted and mixed well with the homogenous mixture of the masterbatch and zein, the temperature was reduced to room temperature and then the softener (Durkee 17) was added until a homogenous mixture was formed. Thereafter, the emulsifier (NM) and triacetin were added and mixed until a homogenous mixture was obtained.

35.00 parts by weight of the gum base prepared as described above was combined with 7.50 parts by weight of corn syrup, 54.96 parts by weight of pulverized sugar, 0.44 parts by weight of each of natural and synthetic peppermint oil, 0.66 part by weight of menthol crystals and 1.0 part by weight of peppermint to form a non-stick gum composition.

The chewing gum composition was divided into a series of multiple groups of samples and chewed for 5 minutes. All of the samples were subjected to an Instron Compression Cycle Test. The Instron Compression Cycle Test is used to apply a cyclic force on a chewed gum composition after it is placed on a substrate (e.g. carpet, leather, concrete, and the like). The force was cycled 20 times to simulate 20 people stepping on the chewing gum after it was placed on the substrate. After the cyclic procedure, each of these groups of samples was divided into five subgroups held for different lengths of time (0, 0.5, 1.0, 24 and 48 hours) at room temperature prior to a subsequent Instron 180° peel test.

In the Instron 180° peel test the substrate was clamped to the lower jaw of the Instron device. The chewing gum that was smeared on the substrate was peeled away from the substrate at an angle of 180° to the substrate surface, until the gum separated from the substrate surface. If any part of the gum composition remained stuck to the substrate surface, it was identified by the letter "S" meaning "stick". If the sample did not stick, it was identified by the letters "NS" mean "non-stick".

The gum composition of the present invention (shown by "S-1") was compared to commercial products on the market advertising non-stick properties. The results are shown in Table 1.

TABLE 1

| TIME (hours) | FORCE = 20 kg | | | | | FORCE = 60 kg | | | | |
| --- | --- | --- | --- | --- | --- | --- | --- | --- | --- | --- |
| | 0 | 0.5 | 1 | 24 | 36 | 0 | 0.5 | 1 | 24 | 36 |
| GUMS | | | | | | | | | | |
| FREEDENT[1] SPM | S | S | S | S | S | S | S | S | S | S |
| FREEDENT[1] PPM | S | S | S | S | S | S | S | S | S | S |
| STICKFREE[2] SPM | S | S | S | S | S | S | S | S | S | S |
| STICKFREE[2] PPM | S | S | S | S | S | S | S | S | S | S |
| FREEZONE[3] | S | S | S | S | S | S | S | S | S | S |
| TRIDENT ORIG.[4] | S | S | S | S | S | S | S | S | S | S |
| CLORETS[4] | S | S | S | S | S | S | S | S | S | S |
| S-1 | NS | NS | NS | NS | NS | NS | NS | NS | NS | NS |

[1]Freedent is a trademark of the Wrigley Co.
[2]Stickfree is a trademark of Nabisco, Inc.
[3]Freezone is a trademark of Lotte, Inc.
[4]Trident and Clorets are trademarks of Warner-Lambert Co.

As shown in Table 1, the gum composition of the present invention exhibited non-stick properties even if after thirty-six hours of contact with the carpet surface while the commercial products stuck to the carpet surface from the moment of contact. It should also be noted that commercial products which are known not to stick to dentures (e.g. Freedent) stick to carpet and other similar surfaces as will be shown in the following examples.

EXAMPLE 3

The test procedure of Example 2 was repeated on a surface of leather/rubber sole shoes except that the force applied to the samples to test non-stick properties was 20 kg and 100 kg, respectively. The results are shown in Table 2.

TABLE 2

| GUMS | FORCE = 20 kg | FORCE = 100 kg |
| --- | --- | --- |
| FREEDENT[1] SPM | S | S |
| FREEDENT[1] PPM | S | S |
| STICKFREE[2] SPM | S | S |
| STICKFREE[2] PPM | S | S |
| FREEZONE[3] | S | S |
| TRIDENT ORIG.[4] | S | S |
| CLORETS[4] | S | S |
| S-1 | NS | NS |

[1]Freedent is a trademark of the Wrigley Co.
[2]Stickfree is a trademark of Nabisco, Inc.
[3]Freezone is a trademark of Lotte, Inc.
[4]Trident and Clorets are trademarks of Warner-Lambert Co.

As shown in Table 2, the gum composition of the present invention exhibited non-stick properties even after 36 hours of contact with the leather/rubber sole surface while the commercial products stick to the surface of the leather/rubber soles from the moment of contact. It should also be noted that commercial products which are known not to stick to dentures (e.g. Freedent) stick to leather and rubber sole surfaces.

EXAMPLE 4

Nine chewing gum bases having non-stick properties in accordance with the present invention were employed in a chewing gum composition in the same manner as Example 1. The gum bases are shown in Table 3.

TABLE 3

| | COMPOSITION NO. (Parts by weight) | | | | | | | | |
| --- | --- | --- | --- | --- | --- | --- | --- | --- | --- |
| INGREDIENTS | 1 | 2 | 3 | 4 | 5 | 6 | 7 | 8 | 9 |
| Zein (40% glycol) | 5.5 | — | — | — | — | — | — | 11.0 | 11.0 |
| Zein (25% glycol) | — | 6.0 | 6.0 | 6.0 | 6.0 | 7.0 | 7.5 | — | — |
| Poly(isobutylene-isoprene) | 9.0 | 9.0 | 9.0 | 9.0 | 9.0 | 7.5 | 7.0 | 8.0 | 8.0 |
| Polyvinyl acetate | 50.0 | 47.5 | 47.5 | 47.5 | 47.5 | 47.5 | 47.5 | 47.5 | 47.5 |
| Emulsifier | 6.0 | 6.0 | 6.0 | 6.0 | 6.0 | 6.0 | 6.0 | 6.0 | 6.0 |
| Cellulose | — | 4.0 | 7.0 | 7.0 | 10.0 | 2.0 | 2.0 | — | — |
| Elastomer/softener | 15.0 | 13.0 | 10.0 | 10.0 | 7.0 | 15.5 | 15.5 | 13.0 | 13.0 |
| Filler | 7.5 | 7.5 | 7.5 | 7.5 | 7.5 | 7.5 | 7.5 | 7.5 | 8.5 |
| Plasticizer | 7.0 | 7.0 | 7.0 | 7.0 | 7.0 | 7.0 | 7.0 | 7.0 | 6.0 |

Each of the compositions 1–9 prepared above exhibited similar non-stick properties to the compositions prepared and tested in accordance with Examples 1–3.

What is claimed is:

1. A non-stick chewing gum base consisting essentially of:
   a) from about 2 to 25% by weight of a plasticized proteinaceous material comprising a protein component and a plasticizer component, said protein component being selected from the group consisting of wheat, corn, rice, soybean, milk or animal protein and said plasticizer component being selected from the group consisting of propylene glycol, ethylene glycol, acetic acid, lactic acid, polypropylene glycol, polyethylene glycol, glycerol and ethanol; wherein a solid state blend of the protein component and the plasticizer component is heated under controlled shear conditions at a temperature of from about 20° C. to about 140° C. to form said plasticized proteinaceous material;
   b) an elastomeric material present at about 2–25% by weight of said gum base or a polyvinyl acetate present at about 25–75% by weight of said gum base or combinations thereof;
   c) a softener present at about 3–35% by weight of said gum base, said softener comprising a fat;
   d) a filler present at about 5 to 25% by weight of the gum base; and,
   e) a cellulosic material selected from the group consisting of cellulose, methyl cellulose, ethyl cellulose, methylhydroxyethyl cellulose, methylhydroxypropyl cellulose, hydroxypropyl cellulose and sodium carboxymethyl cellulose material, present at about 2 to 10% by weight of said gum base;

f) said gum being absent an elastomer solvent and a wax; and the above ingredients being present in amounts sufficient to impart non-stick characteristics to a chewing gum composition including said ingredients, on both porous and non-porous surfaces.

2. The non-stick chewing gum composition of claim 2 wherein the polyvinyl acetate has a molecular weight of at least 8,000.

3. The non-stick chewing gum composition of claim 2 wherein the polyvinyacetate has an weight average molecular weight of from about 8,000 to 100,000.

4. The non-stick chewing gum composition of claim 1 wherein the elastomeric material is a natural elastomer or a synthetic elastomer.

5. The non-stick chewing gum composition of claim 4 wherein the natural elastomers are selected from the group consisting of jelutong, lechi, caspi, perillo, sorva, massaranduba balata, massaranduba chocolate, nispero, nispero rosindinha, chicle, gutta hang kang, smoked or liquid latex, and guayule and combinations thereof.

6. The non-stick chewing gum composition of claim 4 wherein the synthetic elastomers are selected from the group consisting of polyisobutylene, isobutylene-isoprene copolymer, styrene-butadiene copolymer, vinyl acetate-vinyl laurate copolymer, polyisoprene, polyethylene, and combinations thereof.

7. The non-stick chewing gum composition of claim 1 wherein the softener is selected from the group consisting of tallow, hydrogenated tallow, hydrogenated and partially hydrogenated vegetable oils, cocoa butter, glyceryl monostearate, glyceryl monolaurate, glyceryl monooleate, polysorbate 60, polysorbate 65, tween 65, tween 80, glycerol triacetate, lecithin, mono-, di-, and tri-glycerides, acetylated monoglycerides and fatty acids.

8. The non-stick chewing gum composition of claim 1 wherein the filler is selected from the group consisting of magnesium carbonate, calcium carbonate, ground limestone, silicates, clay, alumina, talc, titanium oxide, mono-, di-, and tri-calcium phosphate and cellulose polymers.

9. The non-stick chewing gum composition of claim 1 wherein the protein component includes zein, glutenin, gliadin or mixtures thereof.

* * * * *